US012673228B2

(12) United States Patent
Coulson et al.

(10) Patent No.: US 12,673,228 B2
(45) Date of Patent: Jul. 7, 2026

(54) CONSTANT FLOW RATE REGULATING VALVE ASSEMBLY FOR AN AERIAL FIREFIGHTING BUCKET

(71) Applicant: Coulson Aviation (USA) Inc, Portland, OR (US)

(72) Inventors: Britton Coulson, Port Alberni (CA); Brian McDonald, Parksville (CA); David Lawrence, Courtenay (CA); Mike McClellan, Port Alberni (CA)

(73) Assignee: Coulson Aviation (USA) Inc, Portland, OR (US)

( * ) Notice: Subject to any disclaimer, the term of this patent is extended or adjusted under 35 U.S.C. 154(b) by 841 days.

(21) Appl. No.: 17/373,064

(22) Filed: Jul. 12, 2021

(65) Prior Publication Data

US 2022/0011788 A1 Jan. 13, 2022

Related U.S. Application Data

(60) Provisional application No. 63/050,955, filed on Jul. 13, 2020.

(51) Int. Cl.
*A62C 3/02* (2006.01)
*A62C 37/36* (2006.01)

(52) U.S. Cl.
CPC ............ *A62C 37/04* (2013.01); *A62C 3/0235* (2013.01)

(58) Field of Classification Search
CPC ......... A62C 3/0235; A62C 37/04; A62C 8/02; A62C 31/28; A62C 3/08; A62C 3/0228; A62C 31/02; A62C 3/02; A62C 31/12; A62C 37/00; G05D 7/0623; F16K 1/46;
(Continued)

(56) References Cited

U.S. PATENT DOCUMENTS

| | | | |
|---|---|---|---|
| 1,508,173 | A | 9/1924 | Erwin |
| 3,661,211 | A | 5/1972 | Powers |
| 4,022,377 | A | 5/1977 | Wagner et al. |

(Continued)

FOREIGN PATENT DOCUMENTS

| | | | |
|---|---|---|---|
| AU | 2012201273 | A1 | 9/2012 |
| CA | 1232889 | A1 | 2/1988 |

(Continued)

OTHER PUBLICATIONS

International Search Report and Written Opinion of the International Searching Authority issued in International Application No. PCT/US2021/041285, mailed Jan. 4, 2022, 15 pages.

(Continued)

*Primary Examiner* — Arthur O. Hall
*Assistant Examiner* — Juan C Barrera
(74) *Attorney, Agent, or Firm* — Sterne, Kessler, Goldstein & Fox P.L.L.C.

(57) ABSTRACT

A valve assembly for a firefighting bucket includes a base plate having an opening, a valve body configured to seal the opening of the base plate, and a linear actuator coupled to the valve body and configured to displace the valve body. Valve control systems direct the release of firefighting material through the valve assembly at a constant flow rate. The valve body may have a chamfered, tapered, or rounded surface to restrain the head pressure of the firefighting material.

20 Claims, 10 Drawing Sheets

(58) Field of Classification Search
CPC ..... F16K 1/52; F16K 3/22; F16K 1/38; F16K 1/427; F16K 3/24
USPC ...................................................... 169/47, 53
See application file for complete search history.

(56) References Cited

U.S. PATENT DOCUMENTS

| | | | | |
|---|---|---|---|---|
| 4,474,245 | A | 10/1984 | Arney | |
| 4,576,237 | A | 3/1986 | Arney | |
| 5,279,481 | A | 1/1994 | Trotter et al. | |
| 5,320,185 | A | 6/1994 | Foy et al. | |
| 5,451,016 | A | 9/1995 | Foy et al. | |
| 5,560,429 | A | 10/1996 | Needham | |
| 5,829,809 | A | 11/1998 | Arney et al. | |
| 6,085,586 | A | 7/2000 | Arvidson et al. | |
| 6,125,942 | A | 10/2000 | Kaufman et al. | |
| 6,192,990 | B1 | 2/2001 | Brooke | |
| 6,688,402 | B1 * | 2/2004 | Wise | B64D 1/22 169/44 |
| 7,708,082 | B2 | 5/2010 | Hall et al. | |
| 8,356,676 | B2 * | 1/2013 | Casals | A62C 3/0235 169/53 |
| D682,855 | S | 5/2013 | Iden | |
| 8,453,753 | B2 | 6/2013 | Hall et al. | |
| 9,265,977 | B2 | 2/2016 | Toeckes et al. | |
| 9,914,000 | B2 | 3/2018 | Black | |
| 2005/0087651 | A1 | 4/2005 | Powers et al. | |
| 2011/0232926 | A1 | 9/2011 | Arney et al. | |
| 2012/0222874 | A1 * | 9/2012 | Toeckes | A62C 31/28 251/324 |
| 2013/0199804 | A1 | 8/2013 | Parker | |
| 2013/0206430 | A1 | 8/2013 | Zheng | |
| 2017/0072234 | A1 * | 3/2017 | Álvarez Montaner | A62C 5/02 |
| 2020/0130832 | A1 * | 4/2020 | Black | B67D 3/02 |

FOREIGN PATENT DOCUMENTS

| | | | |
|---|---|---|---|
| CA | 2124166 | A1 | 11/1995 |
| CA | 2238895 | A1 | 11/1998 |
| CA | 2297296 | A1 | 5/2001 |
| CA | 2535990 | A1 | 3/2004 |
| CA | 2698741 | A1 | 3/2004 |
| CA | 2732183 | A1 | 8/2011 |
| CA | 2770005 | A1 | 9/2012 |
| CA | 2805459 | A1 | 9/2013 |
| KR | 20170055257 | A | 5/2017 |

OTHER PUBLICATIONS

AbsoluteFireCanada, "Absolute Fire Solutions FAST Bucket," https://www.youtube.com/watch?v=5suKbUAZVW8, dated Feb. 21, 2008, 1 page.

Bambi Bucket, "SEI Bambi Bucket aerial fire fighting industry standard," https://www.youtube.com/watch?app=desktop&v=VV4RB0PrJ-Y, dated Apr. 10, 2015, 1 page.

Bambi Bucket, "Discovery Channel's Daily Planet Featuring Bambi Bucket," https://www.youtube.com/watch?v=4oilT_-lugM, dated Dec. 3, 2015, 1 page.

* cited by examiner

CONSTANT FLOW RATE REGULATING VALVE ASSEMBLY FOR AN AERIAL FIREFIGHTING BUCKET

CROSS-REFERENCE TO RELATED APPLICATIONS

This application claims the benefit of and priority to U.S. Provisional Patent Application No. 63/050,955, filed Jul. 13, 2020, which is incorporated herein by reference in its entirety for all purposes.

FIELD

The present disclosure relates to mechanical valves and valve control systems, for example, for aerial firefighting buckets. More specifically, embodiments relate to valves (e.g., electrically actuated valves) that may be used to provide a constant flow rate of released material from containers, such as aerial firefighting buckets, and which may be exposed to high-energy collisions.

BACKGROUND

Aerial firefighting suppression systems for dispersing materials, for example, water, fire retardant, or a mixture thereof, are needed during large or numerous fire outbreaks, for example, forest fires. For example, aircraft carried firefighting buckets are used to fight fire outbreaks by releasing firefighting material from an opening. A valve control system may actuate the opening. Some existing firefighting bucket valves provide binary control such that the dimensions of the opening cannot be modified to regulate the amount and direction of released firefighting material. Therefore, there is a need for precise control of valve actuators that offer the advantages of the features and functionalities of the present disclosure.

In a firefighting bucket, as disclosed in U.S. Pat. No. 5,560,429, the valve system may consist of a dump valve and a remotely controlled actuator. When actuated, a mechanical trip mechanism causes a reel line to release and unwind rapidly, which lowers the closed dump valve and loosens tubular extensions causing sealing lips to separate and permit discharge. Actuation of the valve allows for rapid discharge of fluid. However, the operation may create turbulent flow and undesired lateral dispersion.

Firefighting buckets using flapper valves may have a base plate with an outlet and a flat flapper member over-top of the base plate and surrounding the outlet. The flapper member and base plate may be connected with a hinge allowing the flapper member to move between blocking and exposing positions for the outlet. In operation, the flapper member experiences significant forces from the head pressure of fluid in the bucket. Opening the valve requires a powerful motor to overcome this resistance and results in an undesired high power demand on the aircraft. Further, flapper valves may cause turbulent flow and lateral dispersion. Lateral dispersion is highly undesirable as it leads to wasted payload and increases the amount of liquid and time needed for a firefighting operation.

In another firefighting bucket, as disclosed in U.S. Pat. No. 8,453,753, the valve may consist of a dual flapper valve, which typically includes a longitudinally extending axle having two coplanar plates extending laterally therefrom. The dual flapper valve may connect to a bottom portion of the bucket and is located in an opening therein. When closed, plates may seal against an interior surface of the bucket. The valve may be operated by a remotely controlled actuator, for example, and opened by rotating the plates around the axle. This, however, demands a large amount of power, supplied from the aircraft, to drive the large plates against the pressure applied by the firefighting fluid.

A multi-dump metering valve, as disclosed in U.S. Pat. No. 6,192,990, may consist of a cylindrical valve body, lifting arms, and base plate installed on the bottom surface of a firefighting bucket. The valve body may be operated by a remotely controlled actuator, for example, and lifted and lowered relative to the base of the bucket in order to open and close the valve, respectively. Accordingly, fluid releases at an uncontrolled, variable, and unknown flow rate. Operation in this way may create uneven and/or turbulent flow, leading to wasted firefighting material. Operation demands a large amount of power from the aircraft to drive the components against the head pressure created by the surrounding firefighting material.

A multi-dump metering valve, as disclosed in U.S. Pat. No. 9,265,977, may consist of a hollow tube-like valve body, base plate, top plate, linear actuator, lifting member, and connecting actuator cable installed on the bottom surface of a firefighting bucket. The valve may be sealed by a bottom elastomeric seal mating against the base plate and a top gasket mating against the top plate. The valve may be operated remotely by powering the actuator to move the lifting member of the valve body with the connecting actuator cable. Accordingly, fluid releases at an uncontrolled, variable, and unknown flow rate, which may create uneven and/or turbulent flow, leading to wasted firefighting material.

BRIEF SUMMARY

In some embodiments, a valve assembly for a firefighting bucket includes a base plate having an opening, a valve body configured to cover and/or seal the opening of the base plate, and an actuator coupled to the valve body and configured to displace the valve body. In some embodiments, the actuator is configured to translate the valve body in a vertical direction (relative to its base) to a position that is a percentage of its maximum extension. In some embodiments, the actuator is disposed within an interior space of the valve body. In some embodiments, the base plate includes an annular groove (e.g., to receive a seal) configured to mate with a rim of the valve body in a closed configuration. In some embodiments, the valve body includes a chamfered surface (e.g., disposed at a lower portion of the valve body). In some embodiments, the valve body includes has a conical shape and includes a one-way pressure relief valve (e.g., a flapper valve).

In some embodiments, the valve assembly further includes a lower extruding base assembly coupled to and disposed vertically below the base plate. In some embodiments, the lower extruding base assembly includes a plurality of perforated panels and/or a plurality of concentric annular panels. In some embodiments, the valve assembly further includes a top plate coupled to and disposed vertically above the base plate and/or at least one pressure sensor. In some embodiments, the valve assembly further incudes a plurality of guide rods coupled to (e.g., between) the top plate and the base plate.

In some embodiments, an aerial firefighting system includes a bucket (e.g., suspended from an aircraft) having an opening configured to hold firefighting material, a valve (e.g., having a valve body) configured to seal the opening of the bucket, an actuator coupled to the valve body and configured to displace the valve body release firefighting material (e.g., to maintain a constant flow rate of material) from the bucket, and a pressure sensor (e.g., a plurality of pressure sensors to determine the head pressure, volume, and flow rate of firefighting material within and released from the bucket). In some embodiments, the aerial firefighting system further includes a base plate and a lower extruding base assembly. In some embodiments, a portion of the bucket material is disposed between the base plate and the lower extruding base assembly. In some embodiments, the aerial firefighting system further includes a computing system coupled to and configured to control the actuator in response to a signal from the pressure sensor. In some embodiments, the aerial firefighting system further includes a cable coupling the actuator and the computing system. In some embodiments, the aerial firefighting system further includes an aircraft.

In some embodiments, a method of controlling an aerial firefighting system includes measuring a parameter and actuating an actuator in response to the measured parameter. In some embodiments, actuating the actuator displaces a valve body of a valve assembly of an aerial firefighting system. In some embodiments, the parameter is pressure, volume, weight, or a combination thereof. In some embodiments, the measurement is provided by a sensor, a transducer, or a combination thereof. In some embodiments, the method of controlling an aerial firefighting system further includes maintaining a constant flow rate of material released from the aerial firefighting system. In some embodiments, actuating the actuator comprises increasing an aperture of the valve assembly when the measured parameter decreases.

In some embodiments, a non-transitory computer-readable medium stores instructions that, when executed by a processor of an electronic device, cause the processor to perform operations which include sending a signal to control an actuator, such that controlling the actuator adjusts an aperture of a valve of an aerial firefighting system.

In some embodiments, a firefighting system includes a base plate having an opening, an inner edge upper circular groove configured to receive a mating surface, an outer edge lower circular groove, a chamfered surface, and a plurality of sensors. In some embodiments, the firefighting system includes a top plate spaced apart from the base plate, a valve body having a chamfered surface, a flap pressure release valve, and an actuator installation mount. In some embodiments, the firefighting system includes a plurality of guide rods equally spaced around the base plate opening disposed between the base plate and the top plate, and coupled to the base plate, valve body, and top plate to support a straight travel alignment of the valve body. In some embodiments, the firefighting system includes an actuator disposed between the base plate and the valve body to drive the operation of the valve. In some embodiments, the firefighting system includes a lower extruding base assembly that includes perforated panels, an upper support plate, and a lower support plate, a seal, and shock absorption pads.

In some embodiments, the firefighting system includes an information processor supporting a monitoring system, an automatic constant flow rate control system and a remote valve control system, with a monitor and control panel. In some embodiments, the actuator provides position feedback as to the position of the valve body. In some embodiments, sensors provide an indication of pressure, volume, weight, or a combination thereof applied by material above the base plate.

In some embodiments, the monitoring system includes actuator position input data (e.g., from one or more actuator(s)). In some embodiments, the firefighting system includes sensor input data (e.g., from one or more sensor(s)) and/or transducer input data (e.g., from one or more transducer(s)). In some embodiments, the firefighting system includes an information processor configured to determine and aperture between the valve body and the base plate, a material volume disposed (e.g., contained) within a bucket of the system, and a flow rate of material released from the bucket. In some embodiments, the firefighting system includes a digital display system. In some embodiments, the automatic constant flow rate control system includes an operator input including a weight, a volume, or a combination thereof, of material to be released, a flow rate of material to be released, and a start of material release. In some embodiments, the automatic constant flow rate control system includes an active input from the monitoring system. In some embodiments, the automatic constant flow rate control system includes an active information processing configured to determine and control a valve aperture to match monitoring system data to operator input. In some embodiments, the automatic constant flow rate control system includes an active actuator power regulating system for control of valve operation. In some embodiments, the remote valve control system includes a command option to temporarily open the valve for material release at an undefined flow rate and automatically close the valve when unselected. In some embodiments, the remote valve control system includes a command option to start the automatic valve operation. In some embodiments, the remote valve control system includes a command option to override the automatic valve operation and close the valve.

BRIEF DESCRIPTION OF THE DRAWINGS/FIGURES

The accompanying drawings, which are incorporated herein and form part of the specification, illustrate the present disclosure and, together with the description, further serve to explain the principles thereof and to enable a person skilled in the pertinent art(s) to make and use the same.

Figure 1:
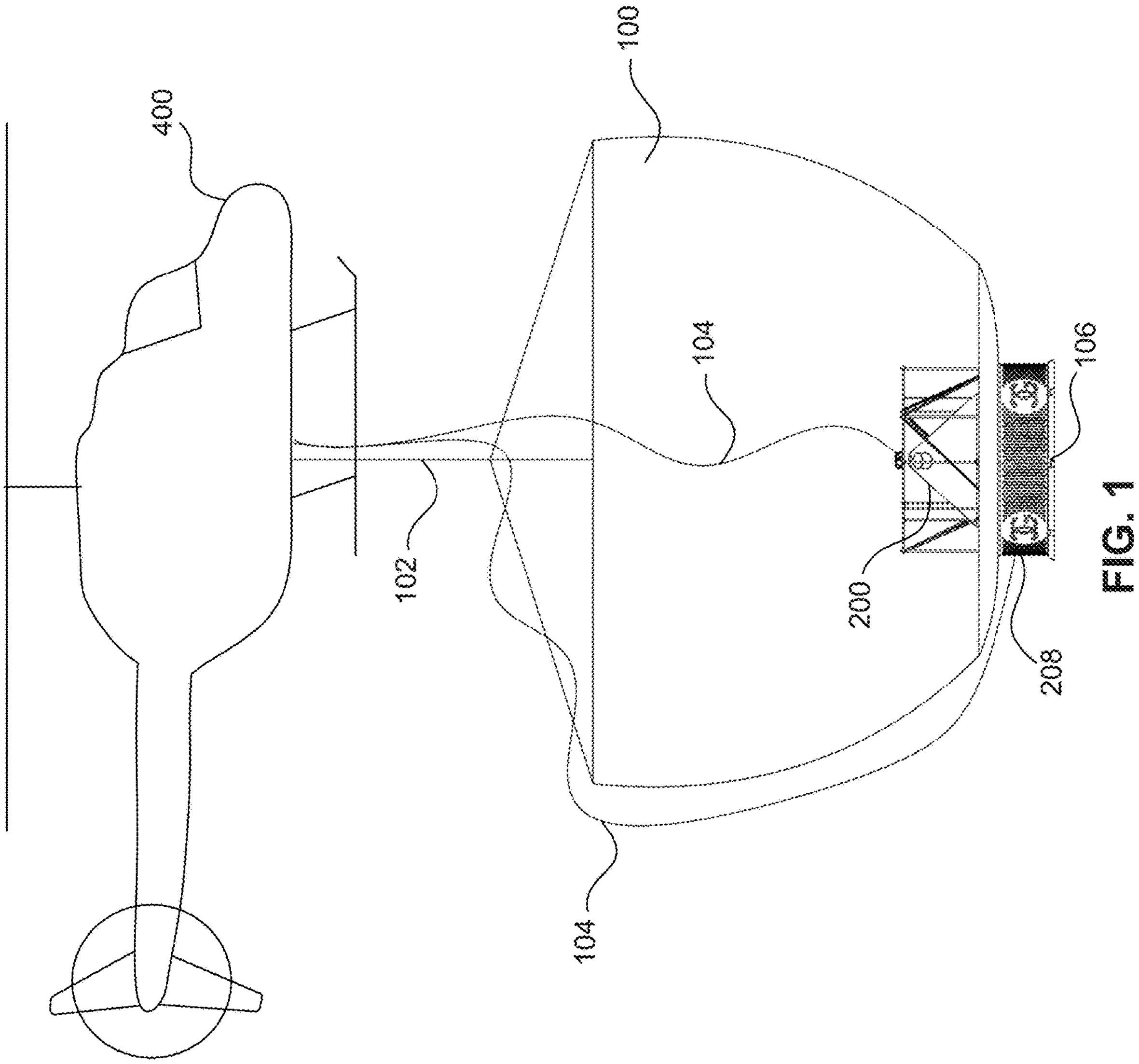
FIG. 1 shows a perspective view of a firefighting bucket suspended from an aircraft according to embodiments, with a portion cutaway to reveal a valve assembly.

The features and advantages of the embodiments will become more apparent from the detailed description set forth below when taken in conjunction with the drawings. A person of ordinary skill in the art will recognize that the drawings may use different reference numbers for identical, functionally similar, and/or structurally similar elements, and that different reference numbers do not necessarily indicate distinct embodiments or elements. Likewise, a person of ordinary skill in the art will recognize that functionalities described with respect to one element are equally applicable to functionally similar, and/or structurally similar elements.

DETAILED DESCRIPTION

The present disclosure will now be described in detail with reference to embodiments thereof as illustrated in the accompanying drawings, in which like reference numerals are used to indicate identical or functionally similar elements. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "about" as used herein indicates the value of a given quantity that can vary based on a particular technology. Based on the particular technology, the term "about" can indicate a value of a given quantity that varies within, for example, 1-15% of the value (e.g., ±1%, ±2%, ±5%, ±10%, or ±15% of the value).

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

The present disclosure provides advanced valve control for aerial firefighting buckets. The valves, valve control systems, and methods provide constant flow rate control. A constant flow rate of released firefighting material reduces the occurrence of turbulent flow and provides greater control over the amount and/or direction of the released firefighting material (e.g., water, fire retardant, or a mixture thereof). The result is a more efficient approach to fighting fire outbreaks. Constant flow rate control additionally allows for multiple "drops" using the same firefighting material payload. A drop in this context is when material is released as part of a firefighting operation. In order to simultaneously provide the aerial firefighting bucket functionality and the constant flow rate control, the systems and methods disclosed herein have unique hardware and software components. For example, in some embodiments, the system may provide remote control and operation of a valve assembly 200 through which firefighting material may be released. In some embodiments, the system may also provide flow rate control for releasing firefighting material through active control of the size of a valve aperture 108.

The disclosed systems also provide for improved maintenance of the components. Some critical components include but are not limited to an actuator, data sensor(s) (e.g., pressure sensors), pumps, check valves, bearing(s), and guide rod(s). Components of the system including critical hardware components may be damaged during firefighting operations. For example, the system may experience high energy collisions such as when buckets are lowered to reservoirs (e.g., for refilling) or to the ground. Damage to and difficulties in accessing the components may result in maintenance delays and increased costs, which negatively impact the success of a firefighting operation. Accordingly, in the disclosed systems, critical hardware components are located outside of the bucket to increase accessibility (e.g., easier viewing and removability). For example, in some embodiments, components may be installed below the base of the firefighting bucket in a lower extruding base assembly 208. In some embodiments, the components may be directly installed on a base plate 210 so they are directly accessible from the base of the firefighting bucket. Additionally, the flow rate control provided by the disclosed systems reduces the frequency at which the bucket needs to be lowered to reservoirs or the ground. Consequently, the number of collisions (e.g., contact between the bucket and another body) is reduced.

FIG. 1 illustrates a firefighting bucket 100 suspended from an aircraft 400 by support cables 102 according to some embodiments. In some embodiments, aircraft 400 may be, for example, a helicopter, an airplane, or an unmanned aerial vehicle. In some embodiments, bucket 100, as shown for example in FIGS. 1-3, may consist of flexible material(s), rigid material(s), or a combination thereof (e.g., fiberglass, plastic, canvas, or metal). Firefighting bucket 100 may be any container, vessel, or other receptacle to contain, store, transport, and/or release firefighting material(s). In some embodiments, bucket 100 may be made of material(s) such that bucket 100 is free-standing when not suspended from aircraft 400 in flight. In some embodiments, bucket 100 may be made of material(s) such that bucket 100 is foldable when not in use (e.g., in storage or transport). Additionally, the interior 110 and exterior 112 sides of bucket 100 may consist of the same or different material combination.

Bucket 100 may contain, for example, a volume of firefighting material such as water, fire retardant, or a mixture thereof. Bucket 100 may be refillable, where additional material (e.g., additional water, fire retardant, or a mixture thereof) may be added to the bucket 100 after initial filling. Naturally occurring or manmade water reservoirs, for example, are common sources from which firefighting buckets are filled. In some embodiments, bucket 100 has a capacity of between about 50 and about 4000 gallons (i.e., U.S. gallons). In some embodiments, bucket 100 has a capacity of between about 100 and about 1000 gallons. In some embodiments, bucket 100 has a capacity of between about 1000 and about 3000 gallons. In some embodiments, bucket 100 has a capacity greater than about 2000 gallons. In some embodiments, bucket 100 may be expandable, which is to say that additional material(s) may be added to bucket 100 to increase its size and therefore the maximum volume of firefighting material that may be held. Similarly, bucket 100 may be reduced in size by removing material(s). Accordingly, the design of bucket 100 may be modified for different environments.

Figure 2:
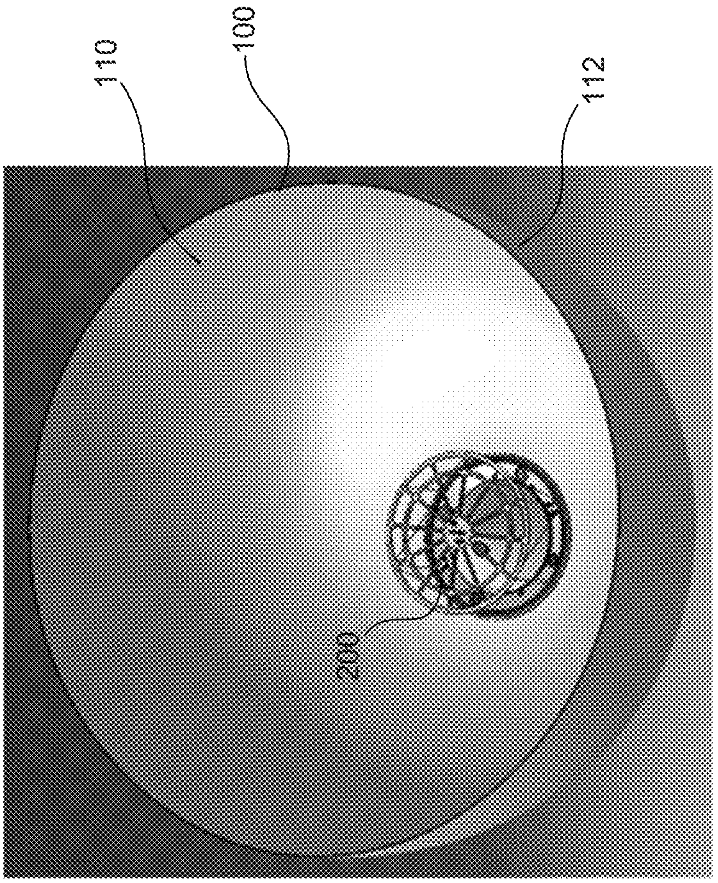
FIG. 2 shows a perspective view of the firefighting bucket of FIG. 1 according to embodiments.
Figure 3:
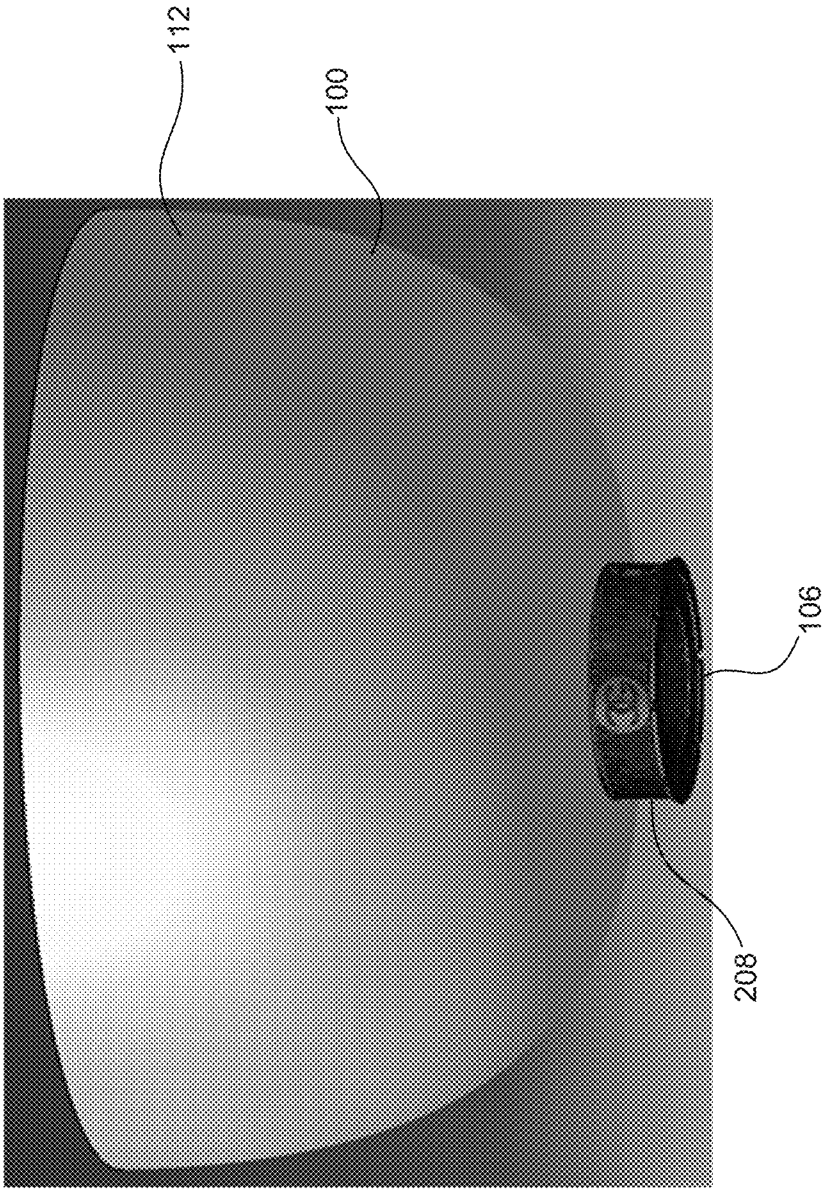
FIG. 3 shows a perspective view of the firefighting bucket of FIG. 1 according to embodiments.

In some embodiments, for example as shown in FIGS. 1 and 2, bucket 100 includes valve assembly 200 to control the release of the firefighting material. The firefighting material may be released though an opening 106 extending through bucket 100 and valve assembly 200. In some embodiments, opening 106 may be centrally located (e.g., a central opening) through bucket 100 and valve assembly 200.

In some embodiments, valve assembly 200 includes, for example, a valve body 202 having a valve body base 204, a base plate 210, an upper support plate 212, an outer frame structure 262, guide rod(s) 286, a top plate 260, and/or an actuator (e.g., a linear actuator or a hydraulic actuator). In some embodiments, valve body 202 may be shaped to reduce the load applied in the direction of travel by the surrounding firefighting material (e.g., chamfered or conical). As a result, the power required to actuate the valve assembly 200 is significantly reduced. A lower duty actuator may therefore be used to open and close valve assembly 200, which reduces the weight and power demand of the system and thus the burden on the aircraft 400. The actuator may, for example, mount directly onto valve body 202 and/or base plate 210 due to the lower applied load, reducing the overall footprint of the system. Thus, the actuator may open and close valve assembly 200 by lifting and lowering valve body 202.

In some embodiments, the lifting of valve body 202 may create valve aperture 108 through which firefighting material flows. Accordingly, the size of valve aperture 108 may be controlled by the actuator (e.g., valve aperture 108 may be 0 to 100% of its maximum size). In some embodiments, valve aperture 108 may be a part of opening 106 that extends through valve assembly 200. In some embodiments valve aperture 108 may be defined as a distance between valve body base 204 and base plate 210. This distance may be within the maximum and minimum clearance allowed by the parts of valve assembly 200. In some embodiments, valve aperture 108 may range from 0 inches (e.g., closed) to about 18 inches (e.g., fully opened). Alternatively, the minimum and/or maximum size of valve aperture 108 may be user-defined. For example, in some embodiments, the maximum valve aperture 108 may be defined to range from about 8 inches to about 14 inches. In some embodiments, the maximum opening of valve aperture 108 may be about 12 inches.

In some embodiments, valve body 202 may contain features for the installation of components including but not limited to pressure release valve(s) 206 (e.g., flap), an actuator installation mount 244, valve body bearing(s) 280, valve body base 204 to provide structural rigidity, and base sealing extrusion(s) 292.

The system may experience high energy collisions such as when buckets are lowered to reservoirs or the ground. In some embodiments, as shown for example in FIGS. 1 and 3-5, a lower extruding base assembly 208 may provide collision protection, for example, when refilling bucket 100 or lowering bucket 100 to the ground. Rather than the bucket hitting the water or the ground, which may damage the bucket 100 (e.g., causing a hole and thus leakage of material carried in the bucket) if lowered too quickly or from repeated use, lower extruding base assembly 208 may provide protection from such impacts by being the first point of contact.

In some embodiments, lower extruding base assembly 208 may contain, for example, a plurality of support plates such as upper support plate 212 and lower support plate 214, and a plurality of panels such as interior base panel 222, exterior base panel 224, and/or a lower base panel 226. In some embodiments, interior base panel 222, exterior base panel 224, and/or lower base panel 226 may support lower support plate 214 and/or other equipment, such as shock absorbing pads 228, to provide additional collision protection, particularly for components installed below base plate 210, such as infill pumps.

Lower support plate 214, lower base panel 226, and/or additional collision protection components (e.g., shock absorption pads) may additionally provide a landing structure. In some embodiments, upper support plate 212 of lower extruding base assembly 208 contains a base sealing extrusion(s) 292 to secure the bucket between base plate 210 and upper support plate 212 (e.g., with a clamping mechanism). In some embodiments, lower support plate 214 may contain features to mount the plurality of panels, such as panels 222, 224, and 226, and other components, such as shock absorbing pads 228. In some embodiments, lower extruding base assembly 208 contains a large opening as part of opening 106 so as to not interfere with the flow path of released material.

In some embodiments, top plate 260 may be installed onto an outer frame structure 262 of valve assembly 200, and at a distance from base plate 210. In some embodiments, the distance between top plate 260 and base plate 210 may be up to about 48 inches. In some embodiments, this distance may be up to about 32 inches. In some embodiments, this distance may be about 26 inches to about 38 inches. In some embodiments, this distance may be adjustable such that top plate 260 and base plate 210 may be arranged at different distances throughout use of the system.

Top plate 260 may provide, for example, a robust surface for equipment installation (e.g., valve body 202), structural and alignment support, additional collision protection, and a surface grip for manual lifting of valve assembly 200. Outer frame structure 262 may provide additional collision protection for valve assembly 200. The installation configuration may allow extension to the maximum valve aperture 108 without contact between valve body 202, top plate 260, and any intermediate parts, such as actuator mount bolts and sensor mount bolts. In some embodiments, top plate 260 may contain top plate outer through hole(s) 290 for the installation of components including but not limited to outer frame structure 262, top plate inner bearing groove(s) 284 for the installation of top plate guide rod bearing(s) 282 and guide rod(s) 286, and central through holes for the installation of additional equipment, such as pressure sensor(s) 250 and/or transducer(s).

In some embodiments, further protection structures may be added over the central location of the top plate 260, to protect equipment, such as pressure sensor(s) 250 and/or transducer(s). In some embodiments, portion(s) of top plate 260 may be removable, for example, at locations where no features are installed. Removing material from top plate 260 may reduce the weight of valve assembly 200 without compromising structural rigidity. In some embodiments, the parts of top plate 260 with removable portions contain control systems similar to the control systems of valve assembly 200 to provide flow rate control of firefighting material at these openings.

In some embodiments, base plate 210 contains an opening that may form part of opening 106, a surrounding outer groove 216 (e.g., for fabric clamp), a surrounding inner groove 230 (e.g., for seal installation), and other features for the installation of components, including but not limited to a seal 218 (e.g., a mating surface such as an elastomeric material), a linear actuator 240, an actuator installation mount 244, pressure sensor(s) 250, infill pumps and respective check valve mechanisms, base bearing(s) 278, guide rod(s) 286, an outer frame structure 262, and a plurality of securing mechanisms (e.g., clamps). In some embodiments, removable guide rod end plate(s) 288 may be installed on base plate 210 for simple installation and removal of guide rod(s) 286. Furthermore, in some embodiments, at least part of surface 220 of base plate 210 may be shaped to reduce the occurrence of turbulent flow during release of firefighting material (e.g., surface 220 may be chamfered, tapered, or rounded).

In some embodiments, device(s) onboard aircraft 400 may receive data from electrical components, transducer(s), and/or sensor(s) coupled to the bucket 100 and/or valve assembly 200. In some embodiments, pressure sensor(s) 250 may be installed on base plate 210, top plate 260, and/or elsewhere on valve assembly 200 to actively measure static pressure and transmit signals, for example, via electrical cables 104 to a computing device onboard aircraft 400. Pressure sensor data may be used to determine the height, and therefore the volume, of material within the bucket, volume loss, and the flow rate of the released material. In some embodiments, additional data may be communicated, which is to say that additional electrical components, transducer(s) and/or sensor(s) may be included in the system. In some embodiments, linear actuator 240 may provide position feedback to determine the size of valve aperture 108, for example. These features may provide, for example, measurements of the payload in bucket 100 and expected flow rate of the material, thus allowing for flow rate control. In some embodiments, a flow meter may be disposed along valve assembly 200 (e.g., below base plate 210) to provide the flow rate of material during release.

In some embodiments, instructions may be transmitted from the device(s) onboard aircraft 400 to the electrical components of valve assembly 200, for example, to open or close valve assembly 200. In some embodiments, the electrical components of valve assembly 200 and the device(s) may communicate wirelessly using known means of wireless communication. Accordingly, the device(s) may be remote such that the electrical components of valve assembly 200 are controlled remotely by one or more devices onboard or offboard aircraft 400.

In some embodiments, as shown in FIG. 1, for example, electrical cables 104 may connect electrical components of valve assembly 200 to one or more devices (e.g., a computing system), for example, located in aircraft 400. This may allow for remote electronic control of valve assembly 200 from aircraft 400. Electrical components of valve assembly 200 include, for example, a linear actuator 240 configured to lift and lower a shaft may be connected to valve body 202. This results in the opening and closing of valve assembly 200, providing opening 106 (e.g., a gap, slot, hole, etc.), in this embodiment a central opening, through which firefighting material may flow. Upon opening valve assembly 200, the firefighting material may flow through valve aperture 108 of valve body 202 and be directed out through central opening 106. In some embodiments, central opening 106 may be the same or approximately (e.g., within 5%) the same diameter as valve body 202.

Figure 4:
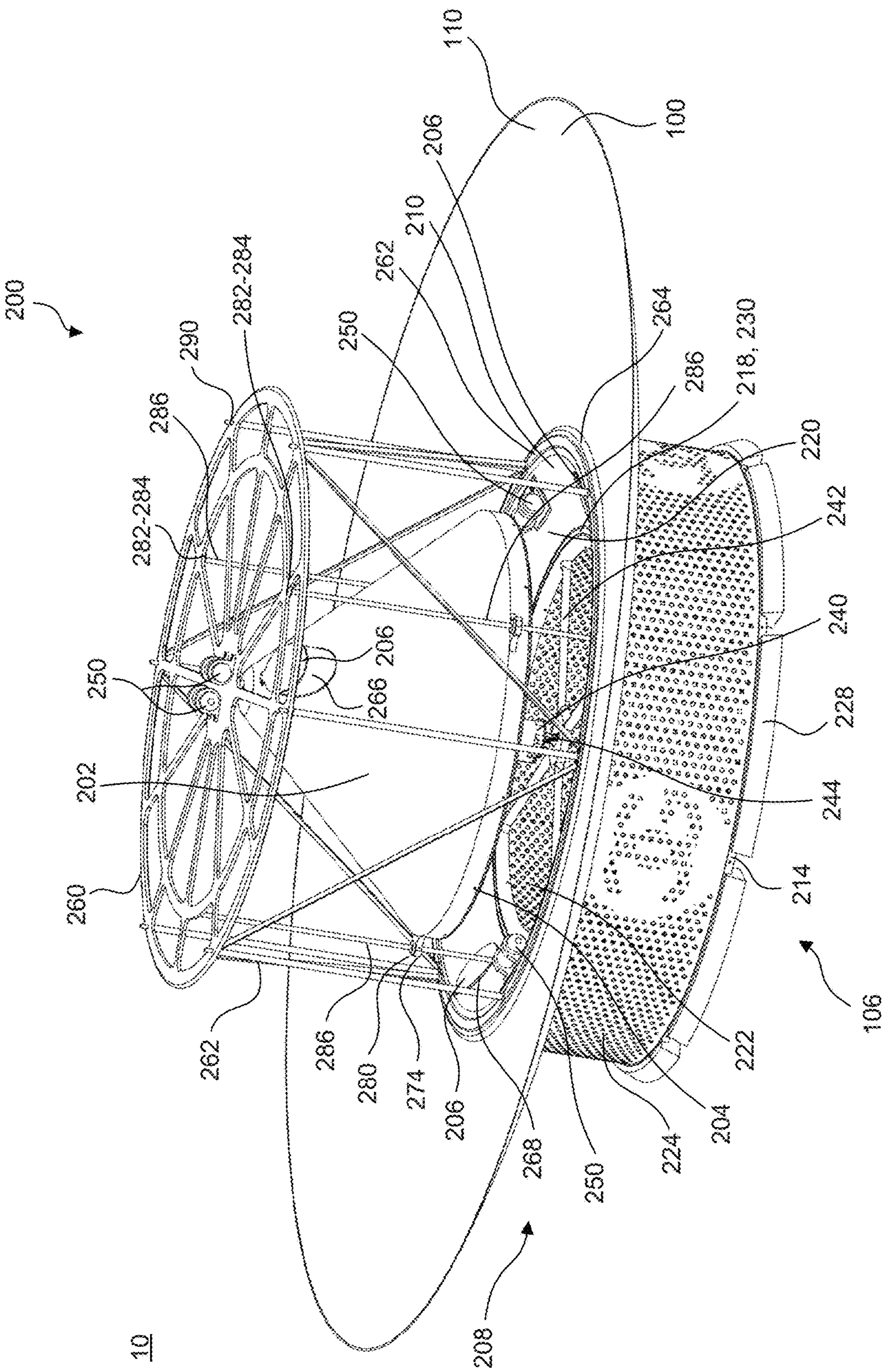
FIG. 4 shows a perspective view of a valve assembly in an open position according to embodiments, with a cutaway portion of a firefighting bucket.
Figure 5:
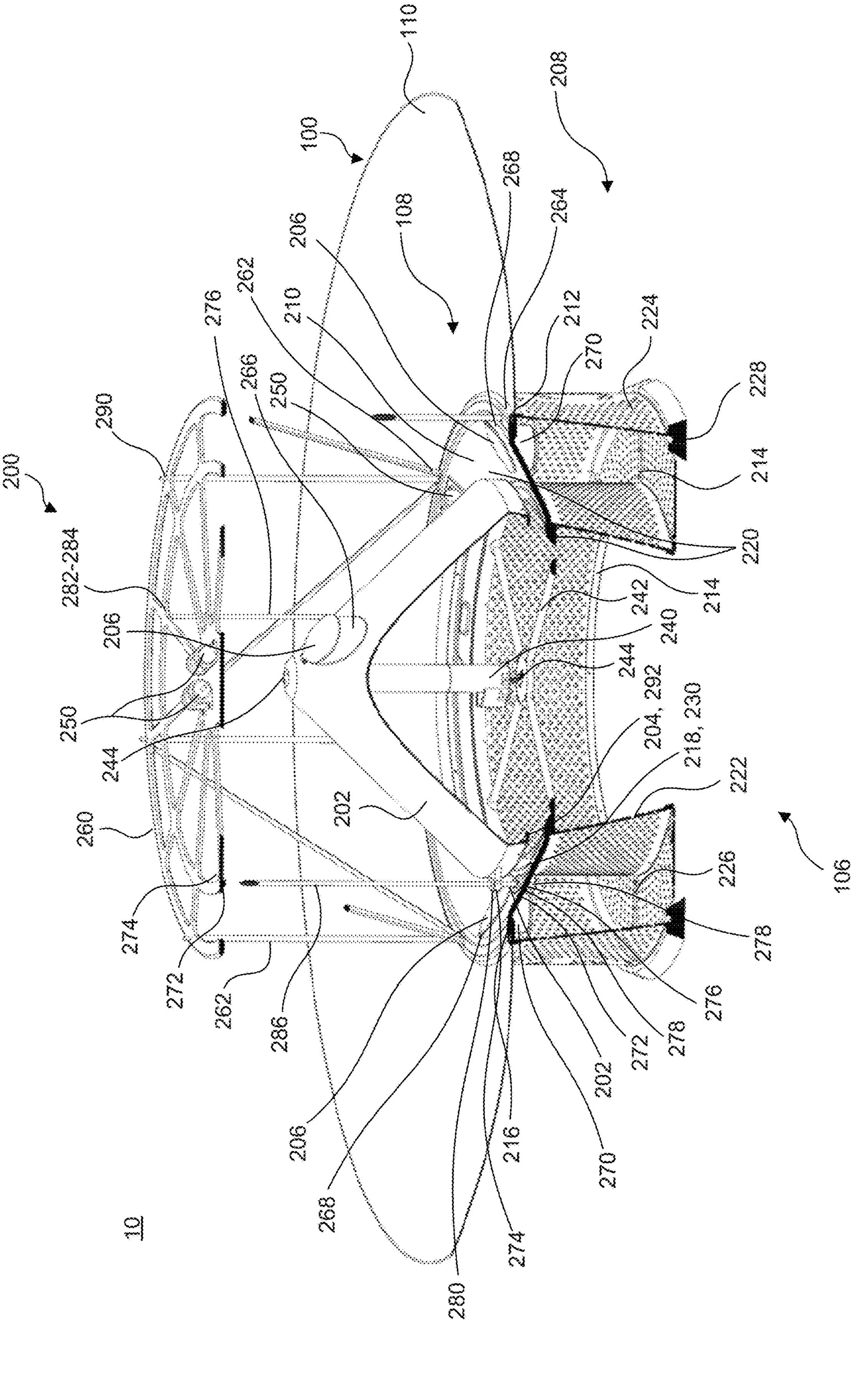
FIG. 5 shows a cross-section of a perspective view of the valve assembly of FIG. 4 in an open position according to embodiments, with a cutaway portion of a firefighting bucket.

FIGS. 4 and 5 show valve assembly 200 in an open position 10, according to embodiments. In some embodiments, constant flow rate of released firefighting material reduces the occurrence of turbulent flow and provides greater control over the amount and direction of the released firefighting material. The result is a more efficient approach to fighting fire outbreaks. Constant flow rate control additionally allows for multiple drops using the same firefighting material payload. In order to simultaneously provide the aerial firefighting bucket functionality and the constant flow rate control, the systems and methods disclosed herein have unique hardware and software components. For example, in some embodiments, the system may provide flow rate control through active control of valve body 202, and therefore valve aperture 108, through which material may flow. This results in increasing or decreasing the size of valve aperture 108 and consequently, the size of central opening 106 of valve assembly 200. Valve assembly 200, for example, may be moved to an open position 10 by controlling the electrical components of valve assembly 200. For example, linear actuator 240 may move valve body 202 in the vertical direction from a closed position where material is restricted from flowing through central opening 106. Accordingly, valve body 202 may be opened to its maximum extension or to a percentage of its maximum extension by controlling linear actuator 240.

By controlling the degree of opening (e.g., vertical position) of valve body 202, a desired flow rate may be achieved and/or maintained. This control may be done manually, or preferably automatically, by analyzing data from transducer(s), sensor(s) on bucket 100 and/or valve assembly 200. For example, as the firefighting material is released through central opening 106, the force of the material pressing down on itself decreases, which can decrease the flow rate of the material through a given aperture. Accordingly, valve aperture 108 may be increased (i.e., made larger), for example, by using linear actuator 240 to move valve body 202 vertically to allow more material to pass through valve aperture 108, thus maintaining the flow rate. For example, when a transducer(s) and/or sensor(s) detects that the material height, material volume, material flow rate, weight, and/or pressure decreases (e.g., the pressure and material flow rate both decrease), valve aperture 108 may be increased (e.g., by moving the valve body 202 vertically) in order to maintain a designated flow rate. Likewise, if the flow rate is too high, valve aperture 108 may be decreased (i.e., made smaller), for example, by using the actuator to move the valve body 202 vertically toward the closed position to allow less material to pass through valve aperture 108.

In some embodiments, as shown for example in FIGS. 1 and 3-5, valve assembly 200 may be configured to enclose the opening of base plate 210. Base sealing extrusion(s) 292 may be, for example, coupled to valve body base 204. In some embodiments, the enclosure is formed by base sealing extrusion(s) 292 applying pressure to a seal 218 (e.g., a mating surface of an elastomeric material), which may be installed, for example, in inner groove 230 on base plate 210. The applied pressure may create a watertight seal, such that seal 218 is watertight, to contain the firefighting material inside bucket 100. Seal 218 has the advantage of, for example, preventing material flow as well as leakage from the lateral direction. In some embodiments, valve body 202 may have a prism or conical shape, which may improve the consistency of the material flow. For example, in some embodiments, valve body 202 may have an upper portion that has a smaller diameter than a lower portion (e.g., near the opening of base plate 210). In some embodiments, valve body 202 may have a diameter that tapers along a portion of the valve body 202 from a lower end to an upper end.

In some embodiments, as shown for example in FIGS. 4 and 5, bucket 100 may be disposed between a base plate 210 and upper support plate 212. In some embodiments, bucket 100 is secured (e.g., clamped) between outer groove 216 (e.g., for fabric clamp) on base plate 210 and upper support plate extrusion(s) 264 on the upper support plate 212. In some embodiments, valve assembly 200 and bucket 100 are secured by a plurality of parts fed through upper support plate 212, bucket 100, base plate 210, and outer frame structure 262.

In some embodiments, base plate 210 containing an opening through which material may flow that is part of central opening 106, may contain a surface 220 (e.g., between the outer frame structure and the inner groove) on the edge of its central opening that is shaped to reduce the creation of turbulent flow as material is released from bucket 100 (e.g., chamfered, tapered, or rounded). In some embodiments, the actuator configured to move valve body 202 may be an electrical linear actuator 240. In some embodiments, linear actuator 240 may be disposed between base plate 210 and valve body 202. In some embodiments, linear actuator 240, for example, may be disposed centrally between base plate 210 and valve body 202. In some embodiments, the base of linear actuator 240 may be installed onto actuator installation mount 244, which may be fixed to the central upper surface of cross-support structure 242 of the base plate 210 and to the top internal surface of valve body 202. In some embodiments, linear actuator 240 may be directly coupled to cross-support structure 242. The top end of linear actuator 240 may be coupled to valve body 202 such that both components move together. When actuated, linear actuator 240 may extend such that valve body 202 moves upward. Likewise, when linear actuator 240 retracts, valve body 202 moves downward.

In some embodiments, valve assembly 200 includes valve body pressure release valve extrusion(s) 266 and base plate 210 includes base plate pressure release valve extrusion(s) 268. Valve body pressure release valve extrusion(s) 266 and base plate pressure release valve extrusion(s) 268 may, for example, support the installation of pressure release valve(s) 206 (e.g., flap), which provide a way to release air trapped below the valve assembly 200 when bucket 100 is lowered into a fluid reservoir. In some embodiments, infill pump extrusion(s) 270 may be installed below pressure release valve(s) 206 (e.g., flap). Infill pump extrusion(s) 270 may, for example, support the installation of infill pumps which may be used to fill and refill bucket 100.

In some embodiments, base plate 210 and/or valve assembly 200 include base bearing extrusion(s) 272 and valve body bearing extrusion(s) 274. Base bearing extrusion(s) 272 and valve body bearing extrusion(s) 274 may, for example, support the installation of base bearing(s) 278 and valve body bearing(s) 280, respectively. In some embodiments, base plate 210 includes a lower feature, such as guide rod end plate extrusion(s) 276. Guide rod end plate extrusion(s) 276 may, for example, support the installation of guide rod end plate(s) 288 for ease of installation of removable guide rod(s) 286. A plurality of guide rod(s) 286 may be installed on base plate 210, through base bearing(s) 278 and through valve body bearing(s) 280 to provide alignment support to the valve body 202 during operation of valve assembly 200.

In some embodiments, the installation arrangement of valve assembly 200 lowers the risk of misalignment and damage to system components. This expedites maintenance tasks and lowers repair costs. Overall maintenance needs are also reduced such that firefighting operations are less frequently disrupted. For example, the actuator may be directly mounted between base plate 210 and valve body 202, driving the operation of valve assembly 200 without the use of intermediate moving parts. Further, guide rod(s) 286, a top plate 260, an outer frame structure 262, a lower extruding base assembly 208, and other surrounding components may be installed to protect and support the operation and structure of valve body 202.

In some embodiments, lower extruding base assembly 208 provides for improved maintenance by increasing the accessibility of system components including critical hardware. For example, installation and removal of equipment may be simpler with increased accessibility. In some embodiments, lower support plate 214, may contain material cut-outs for accessing equipment below base plate 210. In some embodiments, lower extruding base assembly 208 may extend below bucket 100 up to about 36 inches. In some embodiments, lower extruding base assembly 208 may extend below bucket 100 up to about 24 inches. In some embodiments, lower extruding base assembly 208 minimally extends below bucket 100 (e.g., about 6 inches) so that bucket 100 may refill from shallow reservoirs.

In some embodiments, some or all of the plurality of panels such as interior base panel 222, exterior base panel 224, and/or a lower base panel 226 may include perforations (i.e., openings). In some embodiments, interior base panel 222 and exterior base panel 224 may be annular concentric surfaces, for example, and may be coupled to upper support plate 212. In some embodiments, a lower support plate 214 may be coupled to the bottom surfaces of interior base panel 222 and exterior base panel 224 to provide structural rigidity to valve assembly 200. Interior base panel 222 and exterior base panel 224 may be, for example, spaced apart up to about 18 inches. In some embodiments, this spacing is up to about 12 inches. The separation between interior base panel 222 and exterior base panel 224 may allow for the installation of components below base plate 210 (e.g., infill pumps) away from central opening 106. Arranging the components away from central opening 106 may be preferred to minimize interference with the flow of released material from bucket 100.

In some embodiments, lower base panel 226 may be coupled to lower support plate 214 and have an opening that may form part of central opening 106 so as to not interfere with the flow of released material from the bucket 100. Accordingly, interior base panel 222 may couple to upper support plate 212 and lower base panel 226 at the opening of base plate 210. Additionally, in some embodiments, lower base panel 226 may provide the advantage of increasing the bottom surface area of valve assembly 200, and therefore increasing the resistance to submersion into dense matter, such as mud found at the bottom of water reservoirs from which firefighting buckets are commonly filled.

In some embodiments, perforated panels may act as a first stage filtering feature for infill pumps, keeping debris (e.g., rocks, sticks, etc.) from reaching infill pumps that may be disposed inside the open space between the panels. Perforations in panels may also reduce the overall weight of bucket 100 and valve assembly 200 to avoid compromising a large amount of firefighting material payload to counter the addition of lower extruding base assembly 208. Reducing weight is crucial to maximize material payload, for example. Perforations in panels may also provide pattern customization. In some embodiments, perforation patterns may be customized to provide visible displays (e.g., messages, images, company logos, etc.). Additionally, perforation patterns may, for example, be customized to assist with directing release of material (e.g., larger or smaller at different parts of the panels).

In some embodiments, power supplied to the linear actuator 240 lifts and lowers a shaft of the linear actuator 240, and therefore valve body 202. This results in increasing or decreasing the size of a valve aperture 108 of valve body 202 through which material may flow. For example, linear actuator 240 may be lifted to a height corresponding to valve aperture 108 reaching a percentage of its maximum size (e.g., 0 to 100%, about 10% to about 90%, about 20% to about 80%, about 30% to about 70%, or about 40% to about 60%). For example, linear actuator 240 may be lifted to a height corresponding to valve aperture 108 reaching 50% of its maximum size. In some embodiments, linear actuator 240 (or sensor(s) coupled to linear actuator 240) may provide position feedback data via, for example, electrical cables 104 to a device (e.g., a computer having a processor) onboard aircraft 400 to determine the size of valve aperture 108 based on the height of the linear actuator 240. This may facilitate control of the linear actuator 240 based on the valve position in order to maintain a constant flow rate.

In some embodiments, valve assembly 200 incorporates an automatic constant flow rate control system, which may include, for example, pressure sensor data, actuator position feedback, actuator control, operation parameters, and/or operator commands. An advantage of this system is the effective management of the release of firefighting material, resulting in a more efficient approach to fighting fire outbreaks.

Figure 6:
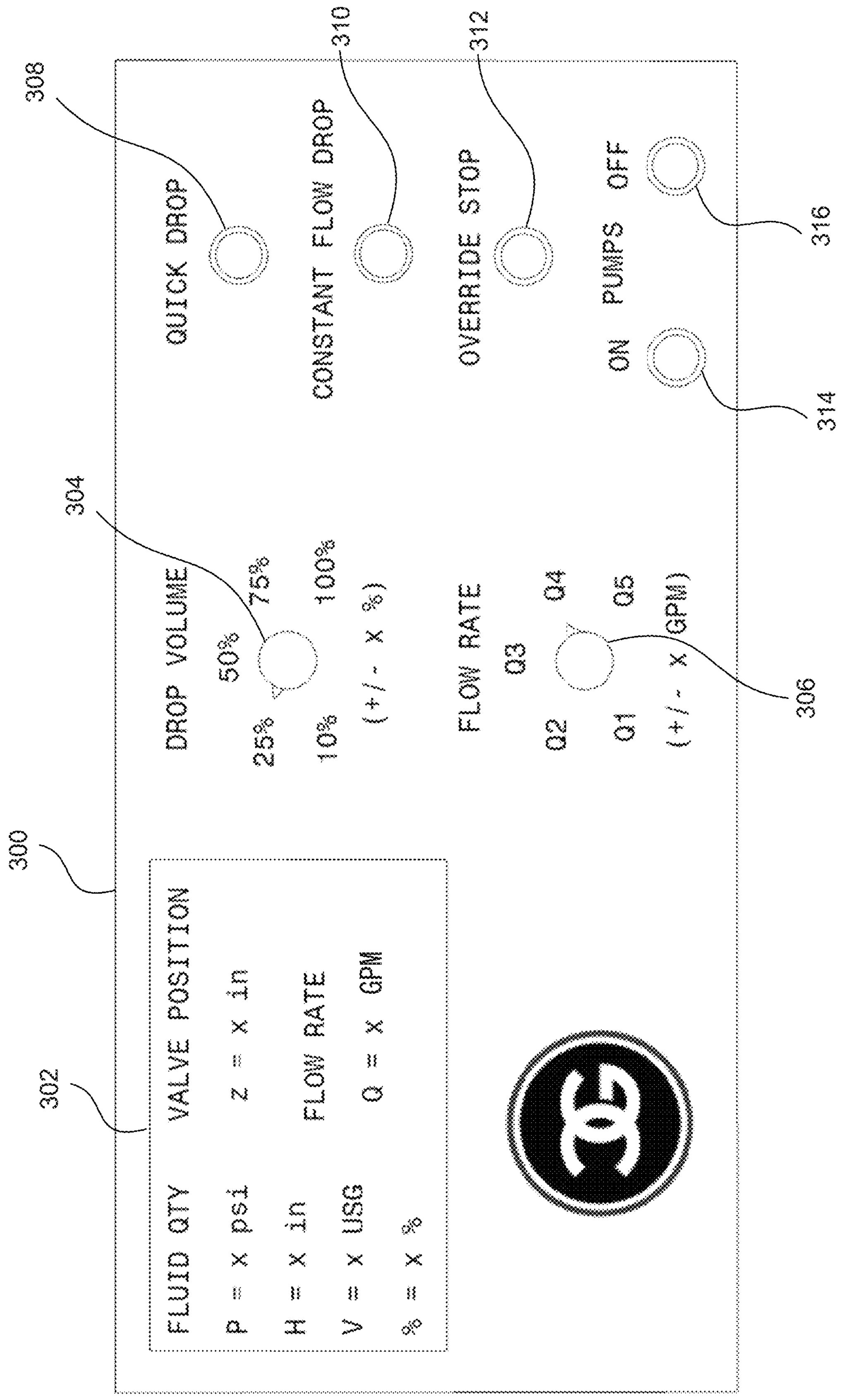
FIG. 6 shows a control panel according to embodiments.

In some embodiments, as shown in FIG. 6, for example, a control panel 300 allows monitoring and control of valve assembly 200. In some embodiments, control circuitry includes an integrated circuit (e.g., an application specific integrated circuit) operatively linked to, for example, linear actuator 240, pressure sensor(s) 250, other sensor(s), transducer(s), infill pumps, and/or control panel 300, to monitor and control operations of valve assembly 200. In some embodiments, control circuitry includes a processor (e.g., a microprocessor, a multi-core processor, a central processing unit) configured to receive signals transmitted from control panel 300 as inputs and generate actuation signals transmitted to, for example, infill pumps and linear actuator 240 for adjusting the valve position (e.g., height). The processor may receive input signals transmitted from, for example, linear actuator 240, transducer(s), pressure sensor(s) 250, or any other sensor(s) coupled to valve assembly 200 and/or bucket 100. The processor may be configured to generate signals transmitted to control panel 300 for indicating, for example, valve position; material flow rate; and/or material pressure, height, volume, and percent remaining. In some embodiments, as shown in FIG. 6, control panel 300 may, for example, contain display 302 (e.g., a digital display) to indicate in real-time the valve position; material flow rate; and/or material pressure, height, volume, and percent remaining.

In some embodiments, control circuitry includes memory including computer storage media in the form of volatile memory, such as RAM, and/or nonvolatile memory, such as ROM. In some embodiments, the memory of control circuitry may be configured to store computer readable instructions, data structures, program modules, and other data, which are inputted to the processor for the execution of operations, as described herein. In some embodiments, control circuitry includes any type of circuitry components, such as a bus, for transmitting instructions stored in the memory to the processor.

In some embodiments, as shown in FIG. 6, for example, control panel 300 includes controls 304, 306, 308, 310, and 312 to actuate the linear actuator 240. The controls may be, for example but not limited to, button, knobs, switches, dials, tactile inputs (e.g., touchscreen), or equivalents thereof. In some embodiments, linear actuator 240 may be wired to the control circuitry, and upon actuation of controls 304, 306, 308, 310, and 312, control circuitry transmits an actuation signal to the linear actuator 240. In some embodiments, manual commands to linear actuator 240 may be configured to override any actuation signal transmitted to the control circuitry by a remote device. The manual commands may be located on linear actuator 240, for example.

In some embodiments, control panel 300 may, for example, include a control 304 to select the drop volume, or the volume of material to be released from bucket 100. Control panel 300 may, for example, include a control 306 to select the flow rate at which material is to be released from bucket 100. Control panel 300 may, for example, include a control 310 to start a constant flow drop (automatic) operation. The processor may determine the valve position needed to achieve the instructed flow rate such that linear actuator 240 is lifted to a height corresponding to a defined size of valve aperture 108. The processor may generate an actuation signal that is transmitted to linear actuator 240 to open or close valve body 202 to a subsequent position. The subsequent position opens or closes valve body 202 to the position needed to achieve the instructed flow rate. As the material is released, the flow rate is actively monitored, and the valve position is actively controlled accordingly to maintain a flow rate equal to the instructed flow rate. For example, as material is released from bucket 100, the volume of material in bucket 100 decreases. The valve body 202 may open further to maintain the instructed flow rate.

In some embodiments, the actual drop volume, or the material volume as it is released, is actively monitored. When the actual drop volume approaches the instructed drop volume, the processor may generate an actuation signal that is transmitted to linear actuator 240 to stop the constant flow drop (automatic) operation. The remaining volume of material may release while valve body 202 returns to its previous position where the previous position is stored in memory. The previous position may be, for example, the normal (i.e., biased or fail) position (e.g., fully closed or fully opened when not actuated). In some embodiments, control panel 300 may contain, for example, a control 312 to override a constant flow drop (automatic) operation start instruction. The processor may generate an actuation signal that is transmitted to linear actuator 240 to stop the constant flow drop (automatic) operation. The remaining volume of material may release while valve body 202 returns to its previous position, where the previous position is stored in memory. The previous position may be, for example, the normal position.

Control panel 300 may, for example, include a control 308 to start a quick (manual) drop operation. In some embodiments, the processor may generate an actuation signal that is transmitted to linear actuator 240 to open or close valve body 202 to a subsequent position. The subsequent position may be, for example, a predetermined position, where the predetermined position is stored in memory. The predetermined position may be, for example, a position such that valve body 202 is opened to 50% of its maximum extension (e.g., a height that is half of the maximum height of valve body 202). This may be the position corresponding to valve aperture 108 reaching 50% of its maximum size. In some embodiments, when control 308 is released, the processor may generate an actuation signal that is transmitted to linear actuator 240 to stop the quick (manual) drop operation. Valve body 202 may, for example, return to the normal position. In some embodiments, if a constant flow drop (automatic) operation was previously running, valve body 202 may return to its previous position, where the previous position is stored in memory. Accordingly, a quick (manual) drop operation may override a constant flow drop (automatic) operation. A quick (manual) drop operation is useful for simple dumps such as when flow rate control is not a primary concern. This includes when the payload weight needs to be adjusted and when the device is operated for a short time period or under severe environmental conditions or emergencies.

In some embodiments, the material volume in bucket 100 is actively monitored. When the material volume in bucket 100 approaches zero such that bucket 100 is almost empty, the processor may generate an actuation signal that is transmitted to linear actuator 240 to return valve body 202 to its normal position. The remaining volume of material may release while valve body 202 returns to its normal position. In some embodiments, the normal position may be when valve body 202 is fully closed. By closing valve assembly 200 when bucket 100 is empty, when bucket 100 is refilled, material waste is prevented because valve assembly 200 is not in open position 10 such that firefighting material can be released. In some embodiments, the normal position of valve body 202 is fully opened, such that when bucket 100 refilled, material waste is prevented because valve assembly 200 closes under the head pressure. In some embodiments, when the material volume in bucket 100 approaches zero such that bucket 100 is almost empty, valve body 202 is moved to a fully closed position. In some embodiments, valve body 202 is moved to a fully closed position even when its normal position is fully opened (e.g., actuator motion is powered in multiple directions).

In some embodiments, as shown in FIG. 6, for example, control panel 300 includes controls 314 and 316 to respectively turn on and off a plurality of infill pumps. In some embodiments, infill pump(s) may be wired to the control circuitry, and upon actuation of control 314, control circuitry transmits an actuation signal to the infill pump(s) (e.g., to turn on). A subsequent actuation of control 316 transmits an actuation signal to the infill pump(s) via the control circuitry to shut off the infill pump(s). In some embodiments, manual commands to infill pump(s) may be configured to override any actuation signal transmitted to the control circuitry by a remote device. The manual commands may be located on the infill pump(s), for example.

In some embodiments, a remote device may be used to pair with, for example, linear actuator 240 and infill pumps to monitor and control the release of material. The remote device includes, for example, a smartphone, a tablet, a near field communication device, a Bluetooth device, a radio-frequency identification (RFID) device, a desktop computer, a laptop computer, a smartwatch, or other suitable device. In some embodiments, the memory of the remote device may store an application in the form of computer readable instructions so that the application may cause the remote device to provide a series of graphical control elements or widgets, such as a graphical user interface (GUI), shown on control panel 300 of the remote device. In some embodiments, display 302 and controls 304, 306, 308, 310, and 312 may be displayed on a GUI of the remote device generated by executing the application. Thus, the same controls and operations described above may be conducted from the remote device.

Figure 7:
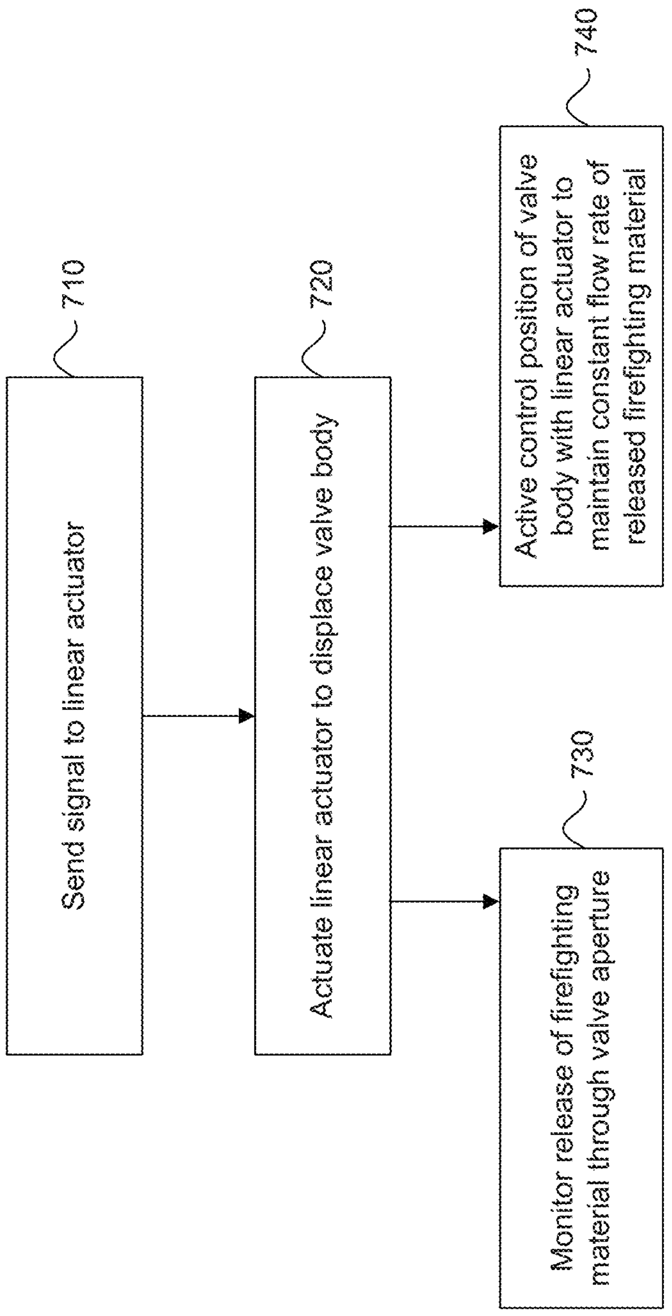
FIG. 7 shows a flow chart of a method for controlling the release of firefighting material according to embodiments.

Methods of operating the valves and valve control systems disclosed herein are also contemplated and include methods of operation as described above. FIG. 7 shows an example block diagram illustrating aspects of a method of controlling a valve and valve control system for an aerial firefighting bucket (e.g., the embodiments shown in FIGS. 1 through 6).

In some embodiments, control panel 300 on a computing device controls the electrical components related to the valve and valve control system during normal operation (e.g., not during shutoff). As described above, the electrical components may include, for example, linear actuator 240. At step 710, control panel 300 may use actuation signals translated via electrical cables 104, for example, to control linear actuator 240.

For example, in some embodiments, at step 720, a method of operating a valve and valve control system for an aerial firefighting bucket includes actuating a linear actuator 240 to displace a valve body 202. In some embodiments, actuating linear actuator 240 includes translating valve body 202 with a linear actuator 240. For example, in some embodiments, control panel 300 actuates linear actuator 240 such that valve body 202 is moved to an open position. This creates a valve aperture 108 through which firefighting material may flow. In some embodiments, at step 730, the release of firefighting material is actively monitored. In some embodiments, the size of valve aperture 108 is actively monitored. In some embodiments, step 740 happens in parallel with step 730. In step 740, linear actuator 240 is actively controlled such that the position of valve body 202 and thus, the size of valve aperture 108, is actively controlled. This active control maintains a constant flow rate of the material released from the valve assembly 200.

Figure 8:
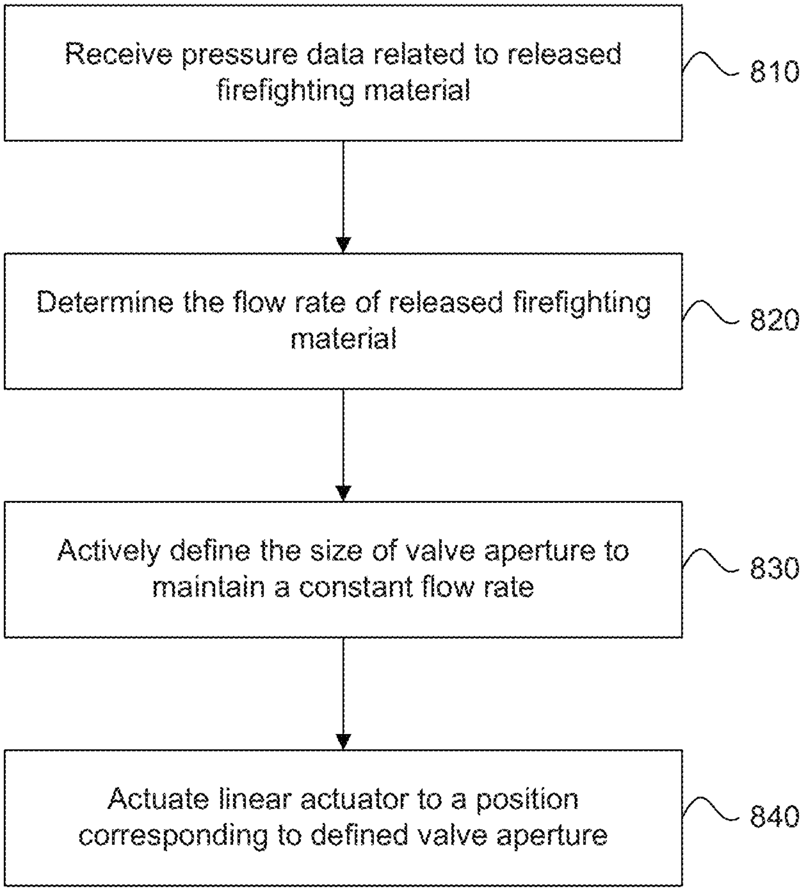
FIG. 8 shows a flow chart of a method for controlling the release of firefighting material according to embodiments.

FIG. 8 shows an example block diagram illustrating aspects of a method of controlling a valve and valve control system for an aerial firefighting bucket (e.g., the embodiments shown in FIGS. 1 through 6).

In some embodiments, a method of operating a valve and valve control system for an aerial firefighting bucket includes actively maintaining a flow rate of firefighting material through valve aperture 108. In some embodiments, control panel 300 on a user device receives, collects, and/or stores information related to the valve and valve control system during normal operation (e.g., not during shutoff). As described above, the information may include, for example, data regarding the pressure of firefighting material to be released; valve position; and material height, volume, flow rate, and/or weight. In some embodiments, at step 810, control panel 300 may receive data from one or more sensors, for example, pressure sensor(s) 250, and/or one or more transducers.

In some embodiments, linear actuator 240 when actuated, translates valve body 202 by lifting it to an open position. This creates valve aperture 108 through which firefighting material may flow. In some embodiments, at step 820, control panel 300 monitors the flow rate of firefighting material being released, for example, by measuring the pressure of released material and/or processing the rate of change in head pressure, and therefore volume, over time. In some embodiments, monitoring the pressure of released material directs the actuation of linear actuator 240. For example, in some embodiments, at step 830, the pressure of released material may be used to actively define the size of valve aperture 108 needed to maintain a constant flow rate. For example, to maintain a constant flow of material, in some embodiments, at step 840, linear actuator 240 may be moved to a position (e.g., height) corresponding to a defined size of valve aperture 108. The size of valve aperture 108 may continue to be manipulated accordingly by opening or closing valve body 202 to achieve the desired flow rate.

Figure 9:
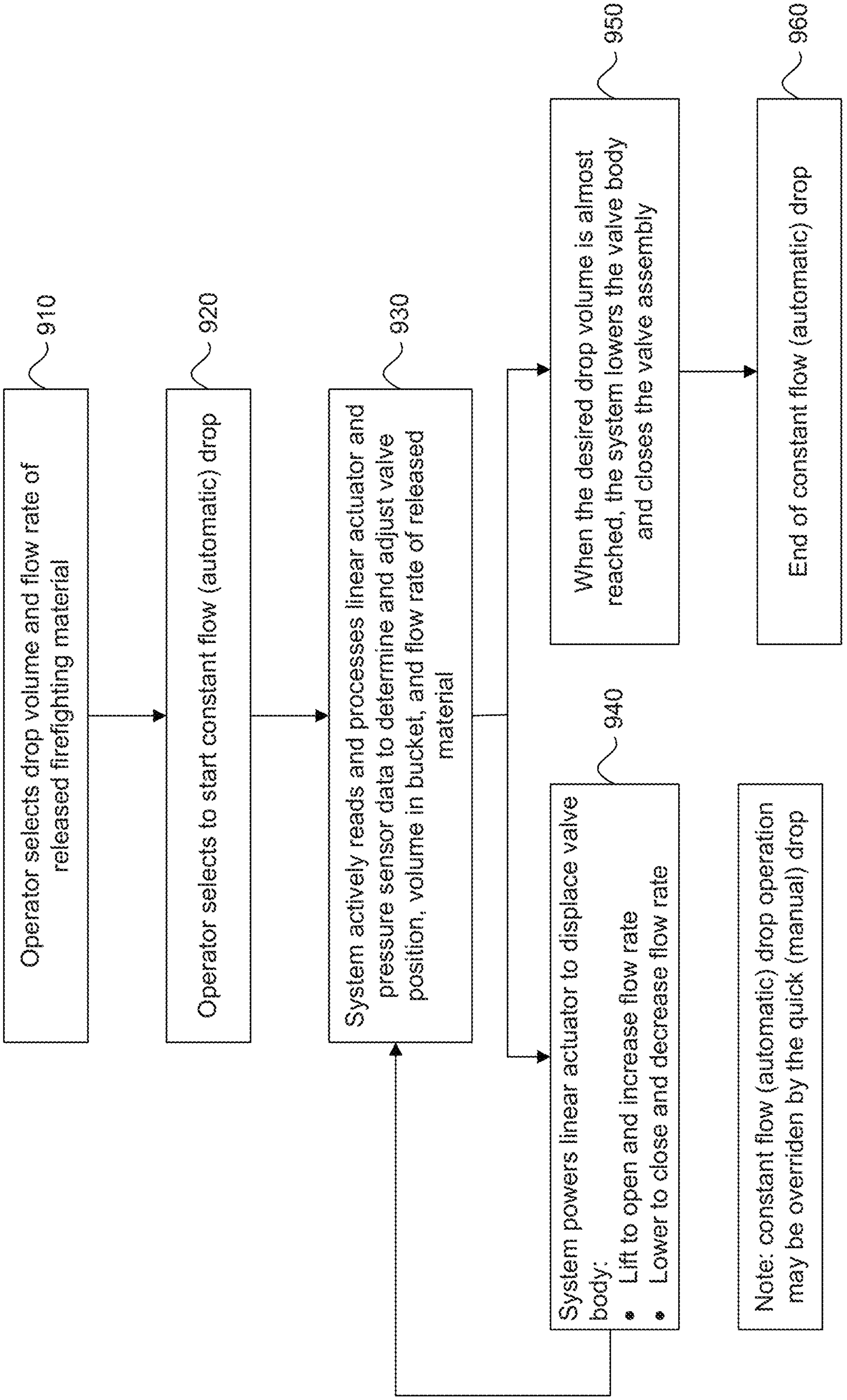
FIG. 9 shows a flow chart of a method for controlling the release of firefighting material according to embodiments.

FIG. 9 shows an example block diagram illustrating aspects of a method of controlling a valve and valve control system for an aerial firefighting bucket (e.g., the embodiments shown in FIGS. 1 through 6).

In some embodiments, an operator may initiate a constant flow drop (automatic) operation. In this operation, valve assembly 200 is actively controlled to meet system inputs. In some embodiments, control panel 300 includes a plurality of controls related to the valve and valve control system. As described above, control panel 300 may include a control 304 to select the drop volume, or the volume of material to be released from bucket 100. Control panel 300 may also include a control 306 to select the flow rate at which material is to be released from bucket 100. In some embodiments, at step 910, an operator may select the desired drop volume and/or flow rate of released firefighting material.

A control 310 may actuate the linear actuator 240 to start a constant flow (automatic) drop operation. In some embodiments, at step 920, control 310 may be actuated (e.g., pressed) to start a constant flow (automatic) drop operation. During this operation, a processor may constantly determine the valve position needed to achieve the instructed flow rate. In some embodiments, at step 930, the system actively reads and processes linear actuator 240, transducer(s), and/or pressure sensor(s) 250 data to determine and adjust valve position (if needed), volume in bucket 100, and flow rate of released material. In some embodiments, at step 940, the linear actuator 240 is powered to displace valve body 202. For example, in step 940, valve body 202 is lifted to open and increase the flow rate or lowered to close and decrease the flow rate. In some embodiments, steps 930-940 are repeated such that linear actuator 240 and consequently valve body 202 are actively controlled.

Steps 930-940 are repeated until the desired drop volume is almost reached. In some embodiments, at step 950, when the desired drop volume is almost reached, the system lowers the valve body 202 and closes valve assembly 200. In some embodiments, in step 960, the closing of valve assembly 200 is the end of the constant flow (automatic) drop operation. In some embodiments, control panel 300 may include a control 312 to override or stop the constant flow (automatic) drop operation. This operation may be overridden or stopped by actuating (e.g., pressing) control 312.

Figure 10:
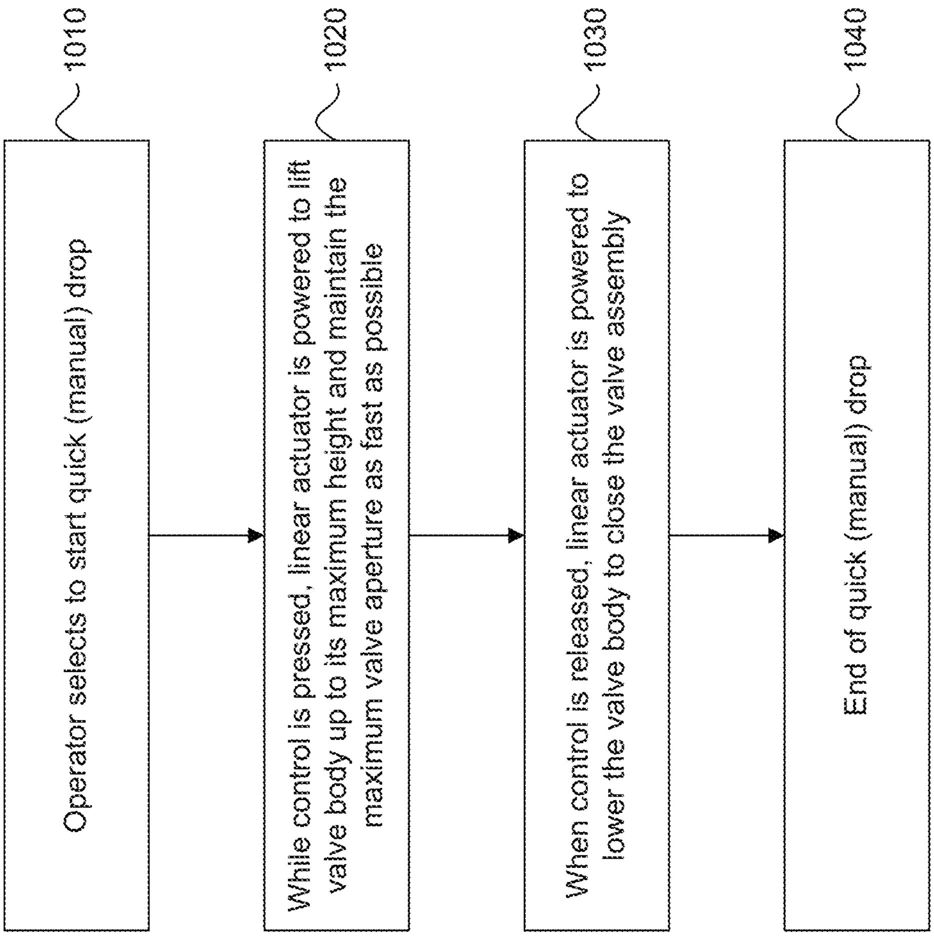
FIG. 10 shows a flow chart of a method for controlling the release of firefighting material according to embodiments.

FIG. 10 shows an example block diagram illustrating aspects of a method of controlling a valve and valve control system for an aerial firefighting bucket (e.g., the embodiments shown in FIGS. 1 through 6).

In some embodiments, an operator may initiate a quick (manual) drop operation. In this operation, valve assembly 200 is actively controlled while the operation is selected. In some embodiments, control panel 300 includes a plurality of controls related to the valve and valve control system. As described above, control panel 300 may include a control 308 to start a quick (manual) drop operation. In some embodiments, at step 1010, control 308 may be actuated (e.g., pressed) to start a quick (manual) drop operation.

In some embodiments, at step 1020, while control 308 is actuated, linear actuator 240 is powered to lift valve body 202 up to its maximum height and maintain the maximum valve aperture 108 as fast as possible. In some embodiments, at step 1030, when control 308 is released, linear actuator 240 is powered to lower valve body 202 to close valve assembly 200. Release of control 308 stops the quick (manual) drop operation. In some embodiments, at step 1040, the closing of valve assembly 200 is the end of the quick (manual) drop operation.

Aspects of this disclosure may be implemented via control and computing hardware components, user-created software, data input components, and data output components. Hardware components include computing and control modules (e.g., system controller(s)), such as microprocessors and computers, configured to effect computational and/or control steps by receiving one or more input values, executing one or more algorithms stored on non-transitory machine-readable media (e.g., software) that provide instruction for manipulating or otherwise acting on input values, and output one or more output values. Such outputs may be displayed or otherwise indicated to an operator for providing information to the operator, for example information as to the status of the instrument or a process being performed thereby, or such outputs may comprise inputs to other processes and/or control algorithms. Data input components comprise elements by which data is input for use by the control and computing hardware components. Such data inputs may comprise, transducers, sensors, as well as manual input elements, such as graphic user interfaces, keyboards, touch screens, microphones, switches, manually-operated scanners, voice-activated input, etc. Data output components may comprise hard drives or other storage media, graphic user interfaces, monitors, indicator lights, audible signals elements, and/or the movement of associated components (e.g., motors, actuators, etc.) Software comprises instructions stored on non-transitory computer-readable media which, when executed by the control and computing hardware, cause the control and computing hardware to perform one or more automated or semi-automated processes.

Accordingly, some embodiments include a non-transitory computer-readable medium storing instructions that, when executed by a processor of an electronic device, cause the processor to perform operations, the operations including any one or more of the operations described herein (e.g., actuating an actuator to control the size of a valve aperture).

In any of the various embodiments, the valve body includes a chamfered surface.

In any of the various embodiments, the actuator is disposed within an interior space of the valve body.

In any of the various embodiments, the valve assembly includes a plurality of guide rods coupled to the top plate and the base plate.

In any of the various embodiments, the valve assembly includes at least one pressure sensor.

In any of the various embodiments, the aerial firefighting system includes a cable coupling the actuator and the computing system.

In any of the various embodiments, the measurement of a parameter for actuating an actuator in response to the measured parameter is obtained by a sensor, a transducer, or a combination thereof.

In any of the various embodiments, the sensors of the firefighting system provide an indication of pressure, volume, weight, or a combination thereof applied by material above the base plate.

In any of the various embodiments, the automatic constant flow rate control system of the firefighting system includes an operator input comprising a weight, a volume, or a combination thereof, of material to be released, a flow rate of material to be released, and a start of material release; an active input from the monitoring system; an active information processing configured to determine and control a valve aperture to match monitoring system data to operator input; and an active actuator power regulating system for control of valve operation.

It is to be understood that the singular forms “a,” “an,” and “the” include plural referents unless the context clearly dictates otherwise. Thus, for example, reference to “a device” includes reference to one or more of such devices, i.e., that there is at least one device. The terms “comprising,” “having,” “including,” “entailing,” and “containing,” or verb tense variants thereof, are to be construed as open-ended terms (i.e., meaning “including, but not limited to,”)

unless otherwise noted. All methods described herein can be performed in any suitable order unless otherwise indicated herein or otherwise clearly contradicted by context. The use of examples or exemplary language (e.g., "such as") is intended merely to better illustrate or describe embodiments and is not intended to limit the scope of the disclosure unless otherwise claimed.

It is to be appreciated that the Detailed Description section, and not the Brief Summary and Abstract sections, is intended to be used to interpret the claims. The Brief Summary and Abstract sections may set forth one or more but not all embodiments of valves, valve control systems, and methods as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A valve assembly for a firefighting bucket, comprising:

a base plate having an opening;

a valve body configured to seal the opening of the base plate;

an actuator coupled to the valve body and configured to displace the valve body; and a lower base assembly extending downward from the base plate, wherein the lower base assembly comprises an annular perforated exterior panel having an outer perimeter and an inner perimeter concentric with the outer perimeter, wherein the inner perimeter forms a panel opening concentric with the opening of the base plate, and wherein the base plate comprises an annular groove configured to mate with a rim of the valve body in a closed configuration.

2. The valve assembly of claim 1, wherein the actuator is configured to translate the valve body in a vertical direction to a position that is a percentage of its maximum extension.

3. The valve assembly of claim 1, further comprising a top plate coupled to and disposed above the base plate.

4. An aerial firefighting system comprising the valve assembly of claim 1, and further comprising:

the firefighting bucket, wherein the firefighting bucket comprises a bucket opening and is configured to hold firefighting material; and a sensor configured to obtain a measurement related to the firefighting material, wherein the valve body is further configured to seal the bucket opening of the firefighting bucket, and wherein the valve body maintains a constant flow rate of material released from the firefighting bucket.

5. The aerial firefighting system of claim 4, wherein at least a portion of the firefighting bucket is disposed between the base plate and the lower base assembly.

6. The aerial firefighting system of claim 4, further comprising a computing system coupled to and configured to control the actuator in response to a signal from the sensor.

7. The aerial firefighting system of claim 4, further comprising an aircraft.

8. The valve assembly of claim 1, further comprising a pressure sensor configured to determine at least one of head pressure, volume, and flow rate of firefighting material.

9. The valve assembly of claim 8, wherein the pressure sensor is coupled to the base plate.

10. The valve assembly of claim 1, wherein the valve assembly comprises an opening concentric with the opening of the base plate to release firefighting material.

11. The valve assembly of claim 1, wherein a surface between an inner edge of the base plate and an outer frame of the base plate is chamfered, tapered, or rounded to reduce the occurrence of turbulent flow.

12. The valve assembly of claim 1, wherein the annular perforated exterior panel extends below the base plate.

13. The valve assembly of claim 1, wherein the opening of the base plate is disposed inside the outer perimeter of the annular perforated exterior panel.

14. The valve assembly of claim 1, wherein the lower base assembly comprises a perforated interior panel.

15. A valve assembly for a firefighting bucket, comprising:

a base plate having an opening;

a valve body configured to seal the opening of the base plate;

an actuator coupled to the valve body and configured to displace the valve body; and a lower base assembly coupled to and disposed below the base plate, wherein the lower base assembly comprises a plurality of concentric perforated panels configured to allow fluid passage during use of the valve assembly, wherein a bottom of a first concentric perforated panel of the plurality of concentric perforated panels is coupled to a bottom of a second concentric perforated panel of the plurality of concentric perforated panels by a lower support plate configured to allow fluid passage during use of the valve assembly, and wherein the first concentric panel is disposed inside a perimeter of the second concentric panel.

16. The valve assembly of claim 15, wherein the plurality of concentric perforated panels are annular.

17. The valve assembly of claim 15, wherein the lower base assembly comprises an opening concentric with the opening of the base plate to release firefighting material.

18. The valve assembly of claim 17, wherein the opening concentric with the opening of the base plate is disposed inside a perimeter of the plurality of concentric perforated panels.

19. The valve assembly of claim 15, wherein a center of the opening of the base plate is collinear with a center of the plurality of concentric perforated panels.

20. The valve assembly of claim 15, wherein a height of the first concentric panel is less than a height of the second concentric panel.

* * * * *